United States Patent Office 3,377,357
Patented Apr. 9, 1968

3,377,357
1,2-BENZOTHIAZEPINE-1,1-DIOXIDES AND THEIR PREPARATION
John J. Traverso, Indianapolis, Ind., assignor to Eli Lilly and Company, Indianapolis, Ind., a corporation of Indiana
No Drawing. Filed June 27, 1966, Ser. No. 560,810
3 Claims. (Cl. 260—327)

This invention relates to certain 1,2-benzothiazepine-1,1-dioxides and to o-benzoyl-N-benzenesulfonyl amidines utilized in their preparation. The benzothiazepines of this invention have utility as hypotensive and diuretic agents as hereinafter described.

The compounds provided by this invention can be represented by the following formula:

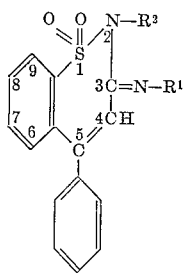

Formula I wherein $R^1$ and $R^2$ are hydrogen or lower alkyl.

"Lower alkyl" as used in this description refers to methyl, ethyl, n-propyl, isopropyl, n-butyl, isobutyl, sec.-butyl, and tert.-butyl.

This structural representation (Formula I) for the compounds of this invention includes an exocyclic double bond connecting carbon number 3 with the exocyclic nitrogen bearing the substituent $R^1$. This is the expected configuration of the structure when $R^2$ is lower alkyl. If, however, $R^2$ is hydrogen, a tautomeric shaft can occur wherein the hydrogen, $R^2$, shifts to become bonded to the exocyclic nitrogen, and the double bond electrons shift endocyclically. This tautomeric representation is shown by Formula II.

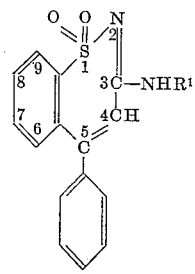

Formula II

Accordingly, compounds containing either tautomeric structure are considered to lie within the scope of the invention.

While the compounds of the present invention have been defined in terms of a structural formula which depicts the novel structural features of the claimed compounds and which indicates the presence therein of certain well-known organic radicals and groups, including lower alkyl, phenyl, and benzothiazepine, it will be recognized by those skilled in the art that such radicals and groups may bear one or more substituent atoms and radicals without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are methyl, chloro, fluoro, bromo, lower alkyl, trifluoromethyl, methoxy, acetyl, acetamido, and the like.

Representative compounds provided by this invention include:

3-methylamino-7-chloro-5-phenyl-1,2-benzothiazepine-1,1-dioxide;
3-ethylamino-7-bromo-5-phenyl-1,2-benzothiazepine-1,1-dioxide;
3-tert.-butylamino-7-methyl-5-(m-tolyl)-1,2-benzothiazepine-1,1-dioxide;
3-isopropylamino-5-(4'-chlorophenyl)-1,2-benzothiazepine-1,1-dioxide;
3-ethylamino-6-fluoro-5-(2'-fluorophenyl)-1,2-benzothiazepine-1,1-dioxide;
3-n-butylamino-6-trifluoromethyl-5-(2'-trifluoromethylphenyl)-1,2-benzothiazepine-1,1-dioxide;
2-methyl-3-methylimino-7-chloro-5-phenyl-2,3-dihydro-1,2-benzothiazepine-1,1-dioxide;
2-isopropyl-3-ethylimino-7-bromo-5-phenyl-2,3-dihydro-1,2-benzothiazepine-1,1-dioxide;
2 methyl-3-tert.-butylimino-7-methyl-5-(3'-methylphenyl)-2,3-dihydro 1,2-benzothiazepine-1,1-dioxide;
2-tert.-butyl-3-isopropylimino-7-chloro-5-(4-'-chlorophenyl)-2,3-dihydro-1,2-benzothiazepine-1,1-dioxide;
2-ethyl-3-ethylimo-6-fluoro-5-(2'-fluorophenyl)-2,3-dihydro-1,2-benzothiazepine-1,1-dioxide; and
2-sec.-butyl-n-butylimino-6-trifluoromethyl-5-(2'-trifluoromethylphenyl)-2,3-dihydro-1,2-benzothiazepine-1,1-dioxide.

The compounds hereinabove described are prepared by the cyclization of appropriately substituted o-benzoyl-N-benzenesulfonylamidines represented by the following formula:

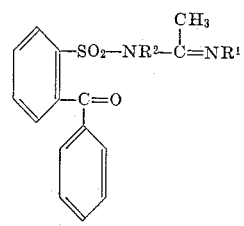

wherein the substituents are as hereinabove defined.

The cyclization can be carried out by the use of typical base condensation conditions; these conditions would be well known to one skilled in the art, for example, by the use of sodium amide in liquid ammonia, sodium ethoxide in ethyl alcohol, Claisen's alkali, or methanolic potassium hydroxide solution, anhydrous potassium hydroxide in dimethyl formamide, or the like.

The sulfonylamidines are prepared by methods analogous to those described in Organic Sulfur Compounds, vol. 1, N. Kharash, ed., New York: Pergamon Press, Symposium Publications Division, 1961.

The following example is illustrative of the procedure available for the preparation of the novel benzothiazepine-1,1-dioxides and is not meant to limit the scope of the invention.

Example

Forty-six grams (0.20 mole) of 2-amino-5-chloro-benzophenone are dissolved in 400 g. acetic acid. Forty-four grams of 12 N hydrochloric acid are added to the solution, followed by 80 g. of ice, and the mixture is diazotized with 30 g. of 46% aqueous sodium nitrite solution (0.20 mole) at 5–10° C. with stirring.

In a separate vessel sulfur dioxide gas is passed through 280 g. of glacial acetic acid, cooled in a cold water bath, until 120 g. of the gas has been absorbed. The resulting solution is poured into a cooled reaction flask fitted with stirrer and containing 2 g. cupric chloride in 10 g. water.

The diazotized material, prepared as described above, is added to the stirred sulfur dioxide-acetic acid solution, 2 minutes being required for the addition. The temperature may rise slightly and nitrogen is given off. The reaction mixture is allowed to stir at room temperature for one hour, and is then poured into an ice slurry. The crude precipitate of crystalline sulfonyl chloride thus obtained is collected. Yield, 45 g.

Six moles (240 g.) of sodium hydroxide, then 3 moles (284 g.) acetamidine hydrochloride, and 2 liters of acetone, are dissolved in 3 liters of water. Three moles (945 g.) of 2-benzoyl-4-chlorobenzenesulfonyl chloride are dissolved in six liters of acetone and added to the aqueous base-amidine solution with stirring. The reaction is completed by warming on the steam bath and concentrating the volume to ½ to ⅓ the original volume in vacuo. The product which has been thereby precipitated is collected to yield 967 g. of crude 2-benzoyl-4-chlorobenzenesulfonylacetamidine.

Twelve grams (0.0366 mole) of the 2-benzoyl-4-chlorobenzenesulfonylacetamidine are added to 500 ml. ethanol containing sodium ethoxide prepared from the previous addition of 2.0 g. (0.087 mole) sodium metal. Initially the mixture is homogeneous. Upon warming to incipient reflux the mixture becomes turbid and basic vapors are evolved during a 2½ hour reflux period. The mixture is cooled and filtered to remove a small amount of sodium sulfite, the solvent is evaporated in vacuo, and the residue is acidified with dilute mineral acid to give a gummy yellow solid. The dilute acid solution is removed by decantation, and the gummy residue is dissolved in a minimum amount of hot methanol, treated three times with decolorizing carbon, and evaporated to ⅓ to ¼ the original volume, from which the desired product, 3-amino-7-chloro-5-phenyl-1,2-benzothiazepine - 1,1 - dioxide, crystallizes. Yield, 2.0 g. Melting point, 315° C. (dec.)

Using the above procedure and appropriately substituted benzophenone and acetamidine derivatives, the following compounds can also be prepared:

3-n-butylamino-5-phenyl-7-chloro-1,2-benzothiazepine-1,1-dioxide;
3-amino-5-(2-chlorophenyl)-6-bromo-1,2-benzothiazepine-1,1-dioxide;
3-ethylamino-5-(3-bromophenyl)-8-fluoro-1,2-benzothiazepine-1,1-dioxide;
3-methylamino-5-(4-fluorophenyl)-9-trifluoromethyl-1,2-benzothiazepine-1,1-dioxide;
3-isobutylamino-5-(2-trifluoromethyl)-6-methoxy-1,2-benzothiazoepine-1,1-dioxide;
3-sec.-butylamino-5-(3-methoxyphenyl)-8-acetylamino-1,2-benzothiazepine-1,1-dioxide;
3-isopropylamino-5-(3-acetylaminophenyl)-7-acetyl-1,2-benzothiazepine-1,1-dioxide;
3-n-propylamino-5-(3-fluorophenyl)-6-fluoro-1,2-benzothiazepine-1,1-dioxide;
3-tert.-butylamino-5-phenyl-9-bromo-1,2-benzothiazepine-1,1-dioxide;
2-n-propyl-3-n-butylimino-5-(2-bromophenyl)-7-bromo-2,3-dihydro-1,2-benzothiazepine-1,1-dioxide;
2-n-butyl-3-ethylimino-5-(3-chlorophenyl)-8-chloro-2,3-dihydro-1,2-benzothiazepine-1,1-dioxide;
2-tert.-butyl-3-methylimino-5-(4-methylphenyl)-7-fluoro-2,3-dihydro-1,2-benzothiazepine-1,1-dioxide;
2-methyl-3-isobutylimino-5-(2-fluorophenyl)-6-fluoro-2,3-dihydro-1,2-benzothiazepine-1,1-dioxide;
2-ethyl-3-isopropylimino-5-(4-trifluoromethylphenyl)-8-trifluoromethyl-2,3-dihydro-1,2-benzothiazepine-1,1-dioxide;
2-isopropyl-3-n-propylimino-5-(3-acetylaminophenyl)-7-acetylamino-2,3-dihydro-1,2-benzothiazepine-1,1-dioxide; and
2-sec.-butyl-3-tert.-butylimino-5-(4-acetylphenyl)-8-acetyl-2,3-dihydro-1,2-benzothiazepine-1,1-dioxide.

The compounds of the present invention are hypotensives, as demonstrated by the following standard test performed on laboratory animals by the method of Goldblatt et al., J. Exp. Med. 59, 347 (1934). In the Goldblatt et al. test, the Wistar strain of rat, as prepared by the method of the reference, is given a measured dose of the test compound by gavage, and the mean and maximum fall in blood pressure produced by the compound over a seven-hour test period is measured and recorded. For example, 3-amino-7-chloro-5-phenyl-1,2-benzothiazepine - 1,1 - dioxide when given orally at 20 g./per kg. of body weight reduces the mean blood pressure by 3.11% for 7 hours with a maximum fall of 5.73% occurring at 6 hours.

The compounds also possess diuretic activity, as determined by a modification of the method developed by Lipchitz et al., J. Pharm. Exper. Therap., 79, 97 (1943). This test is carried out as follows: Adult female rats weighing between 180 and 200 grams are force-fed by stomach tube with isotonic sodium chloride solution at a dose of 15 mg./kg. of rat body weight. This process is known technically as "loading." The "loaded" rats are then divided into groups of eight animals in each group. The drug under test is suspended in one percent acacia in isotonic saline and is administered orally by stomach tube to the rats. Each group of eight rats is given a different dose level of the drug. One group of eight animals is given the saline solution containing no test drug and functions as a control group. In addition, a known drug is customarily run as a positive control at a dose level which is known to give a reasonable urine output in 4.5 hours. The urine output for a period of 4.5 hours after administration of the drug is collected. The total urine output and the total excretion of sodium ion, potassium ion, and chloride ion are measured for each group of eight animals.

The data thus collected are then analyzed for a statistical significance by methods well known in the art. 3-amino-7-chloro-5-phenyl-1,2-benzothiazepine-1,1 - dioxide when given orally at 5 mg. per kg. of body weight in 1% acacia solution gives an increase in urine volume of 1.22 ml. and increases in sodium, potassium, and chloride microequivalents of 207.9, 90.0, and 284.8 respectively. When the compound is given at 50 mg. per kg. of body weight, the increases over control values are 2.32 ml. of urine volume and 372.7, 149.9, and 501.3 microequivalents of sodium, potassium, and chloride, respectively.

I claim:
1. A compound of the formula

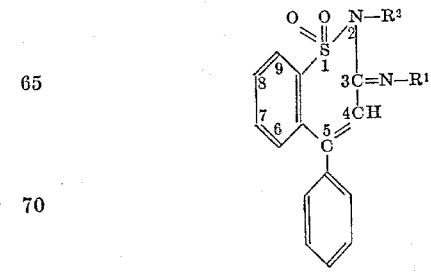

wherein $R^1$ and $R^2$ are hydrogen or lower alkyl.

2. A compound as in claim 1, said compound being 3-amino-7-chloro-5-phenyl-1,2-benzothiazepine-1,1-dioxide.

3. A method for preparing a 3-amino-5-phenyl-1,2-benzothiazepine-1,1-dioxide which comprises treating an appropriately substituted N-(2-benzoylbenzenesulfonyl) acetamidine with a strong basic reagent in a non-reacting solvent system, acidifying and filtering or decanting to remove the resulting desired product.

References Cited

Wei et al.: Jour. of Hetero. Chem., vol. 3, March 1966, pages 1–3.

JAMES A. PATTEN, *Primary Examiner.*